Aug. 26, 1924.
A. L. EUSTICE
CLAMPING MEANS
Filed May 10, 1922
1,506,520
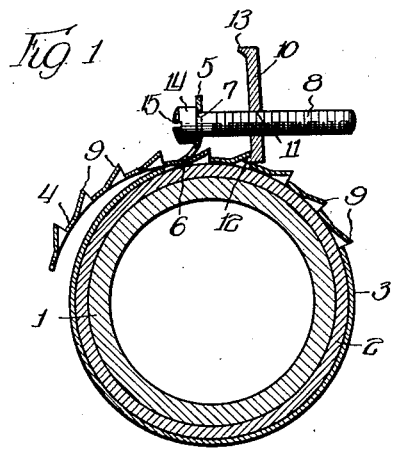
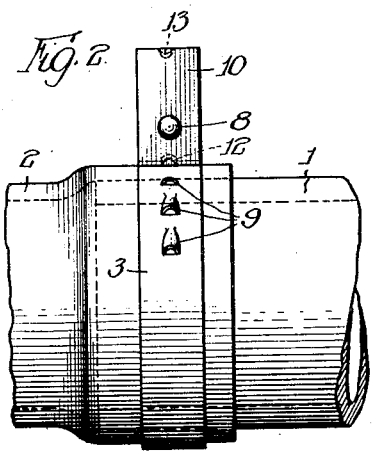
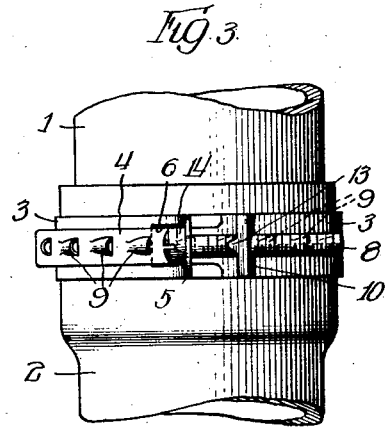
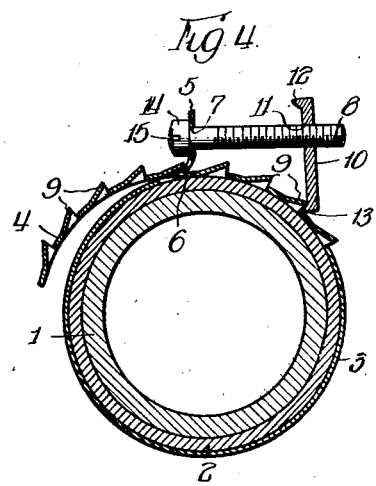
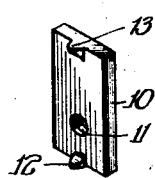
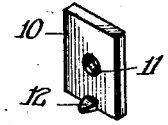
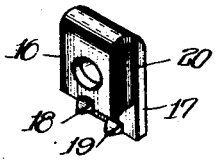
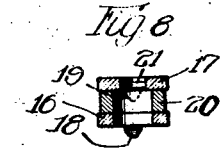
Witness:
P. Burkhardt.
Inventor:
Alfred L. Eustice
By Wilkinson, Huxley, Byron & Knight
Attys.

Patented Aug. 26, 1924.

1,506,520

UNITED STATES PATENT OFFICE.

ALFRED L. EUSTICE, OF CHICAGO, ILLINOIS.

CLAMPING MEANS.

Application filed May 10, 1922. Serial No. 559,763.

*To all whom it may concern:*

Be it known that I, ALFRED L. EUSTICE, a citizen of the United States, residing at Chicago, in the county of Cook and State of Illinois, have invented certain new and useful Improvements in Clamping Means, of which the following is a specification.

The present invention relates to clamping means.

The present invention is illustrated in connection with clamps suitable for securing a hose upon a piece of pipe, but is equally useful for clamping a pipe for electrical grounding purposes and for many other purposes. Various clamps for these purposes have been devised and are being used. Certain objections exist with relation to many of such clamps with which applicant is familiar for the reason that they are inconvenient to apply or have a cutting action upon the members upon which they are mounted, or are costly in manufacture, or have other objectionable features which need not be cited in detail herein.

An object of the present invention is to provide a clamp comprising a band and certain novel holding means whereby said clamp may be conveniently applied.

A further object is to provide a clamp having parts which may be readily applied in loose condition and conveniently drawn up to a tight holding position.

A further object is to provide a clamp which may be readily operated, which minimizes cutting effects, which has a secure holding action, and which is cheap to manufacture.

A further object is to provide a readily operable clamp which will grip substantially uniformly throughout almost its entire circumference.

A further object is to provide a clamp suitable for application to members of various sizes.

A further object is to provide a clamp applicable to members of various sizes and which will have a minimum of loose projecting parts.

Further objects will appear as the description proceeds.

Referring to the drawings—

Figure 1 illustrates one embodiment of the present invention applied to a cylindrical member;

Figure 2 is a view in elevation taken at right angles to the plane of Figure 1;

Figure 3 is another view of the clamp illustrated in Figures 1 and 2;

Figure 4 is a view similar to Figure 1 but showing the parts arranged for application to a larger cylindrical member;

Figure 5 illustrates a detail of construction of the embodiment illustrated in Figures 1 to 5;

Figure 6 illustrates a modification of the detail shown in Figure 5; and

Figures 7 and 8 illustrate views of a further modification of the detail illustrated in Figure 5.

The numeral 1 indicates a pipe encased by a piece of tubing 2, which may be of flexible material such as hose. The tubing 2 is firmly clamped upon the pipe 1 by means of the band 3, which should preferably be composed of metal. The metal of the band 3 should be pliable, flexible and tough. Iron or steel may be used as the material. As illustrated in Figure 3, the band 3 has a reduced end portion 4, which for purposes of description may be referred to as a tongue. The other end of the band 3 is upturned, as indicated by the numeral 5, and is provided near the base of the upturned portion with an opening 6 through which the tongue 4 may project. The upturned portion 5 is provided with a hole 7 for the reception of a screw bolt 8, the functions of which will be referred to hereinafter. The band 3 is provided with a series of catch members 9—9, which may be located midway of the width of the band 3. Said catch members 9—9 are located at the end of the band upon which the tongue 4 is located and will occupy positions upon said tongue and also upon the wider portion of the band adjacent to said tongue. Said catch members 9—9 may be formed by swaging out the material of the band in a manner which will be obvious without detailed description.

A nut 10 is provided, which may have the screw-threaded hole 11 displaced from the center of said nut. Said nut is provided with fingers 12 and 13 centrally placed on opposite side edges of said nut. The hole 11 will be located materially closer to one of said fingers than to the other of said fingers for reasons which will be referred to hereinafter. The bolt 8 is provided with a head 14 provided with the slot 15 for the accommodation of the screw-driver, by means of which the bolt 8 may be operated in the nut 10 for applying compression to the band 3.

In applying the band 3 to a member to be clamped, the tongue 4 will be inserted through the slot 6 and the bolt 8 will be inserted through the hole 7 in the upturned portion 5. The operator may apply the finger 12 or the finger 13 to one of the catch members 9—9, threading the bolt 8 into the nut 10 by applying a turning movement thereto. The operator's choice between fingers 12 and 13 for application to the catch members 9—9 will depend upon the size of the tubing 2 to which the band 3 is being applied, and will also depend upon the amount of "takeup" which is to be had. If considerable takeup in the tubing 2 is to be accomplished, the finger 13, which is more distant from the hole 11 than is the finger 12, will be applied to one of the catch members 9—9, whereby engagement between the nut 10 and bolt 8 may be had with the bolt in normal right angular relation to the nut 10. As the bolt 8 is given a movement of rotation, the nut 10 and upturned portion 5 of the band 3 will be drawn together, reducing the diameter of the band and clamping the tubing 2 upon the pipe 1. When the band is drawn up to home position and the operator continues to turn the bolt 8, the nut 10, by reason of the fact that the engaging finger thereof is held against further movement, will assume a position other than its normal right angular position with relation to the axis of the bolt 8, whereby a locking effect will be accomplished. The locking effect referred to will not interfere with the tight clamping of the band 3 upon the tubing 2, such locking effect coming into action only after the band 3 has substantially ceased its contractive movement due to occupying its home clamping position.

The detail illustrated in Figure 6 represents a modification of the nut 10. In the modification illustrated in Figure 6, only one finger is provided. By this construction the length of the nut 10 may be very materially reduced, though the clamp will not have the wide range of applicability possible through the use of the nut illustrated in Figures 1 to 5.

According to the modification illustrated in Figures 7 and 8, the nut is in the form of an elongated strip of metal, bent into U-shape, having the two members 16 and 17, of which the member 17 is materially longer than the member 16. Said member 16 is provided with the finger 18, while the member 17 is provided with the finger 19. The two members 16 and 17 may be spaced apart by the spacer 20. The longer member 17 may be provided with the screw-threaded hole 21 for the reception of the screw-threaded bolt 8. The member 16 and the spacer 20 will be provided with materially larger holes, which need not be screw-threaded, said larger holes permitting the necessary angular play of the bolt 8 while the band is being drawn to home position. In the use of the modification illustrated in Figures 7 and 8, the two fingers 18 and 19 will be engaged with adjacent catch members 9—9. For this reason, when the modification illustrated in Figures 7 and 8 is used, said adjacent catch members 9—9 should be uniformly spaced apart a distance equal to the distance between the bases of said fingers 18 and 19.

All of the nuts illustrated will have the locking action referred to above whereby to permit the drawing home of the clamping member without interference and whereby to have a very secure locking action after the band 3 is in its home position. Furthermore, each of the modifications disclosed will have a uniform clamping action throughout the band 3. Pinching is avoided by reason of the substantially tangential action of screw-bolt 8.

After the band is drawn up to its proper position, the end of the tongue 4 projecting beyond the slot 6 may be readily removed by bending same about the line where said tongue projects through the slot 6. A few bending movements will cause the tongue to break off, leaving no loose projecting parts. The removal of the end of the tongue will not interfere with the removal of the clamp, nor will it interfere with the application of the clamp to the same tube 2 again, or to a smaller tube.

The described embodiments have been chosen merely for the purpose of illustration and should not be considered in a limiting sense. Many modifications will occur to those skilled in the art. It is intended in this patent to cover all such modifications that fall within the scope of the invention as defined by the appended claims.

I claim:

1. A clamping member comprising a band having a reduced end portion and a hole adjacent to the other end thereof through which said reduced portion is adapted to project, outwardly projecting catch members on said band adjacent to said reduced end portion, bolt means cooperating with said other end and a nut engaging one of said catch members for drawing said clamping member to clamping position.

2. A clamping member comprising an elongated band having an upturned end portion and a hole adjacent to said end portion, said band also having a reduced end portion at the other end thereof, said reduced end portion being adapted to extend through said hole to form an enclosure, said band being provided with outwardly extending catch members, bolt means cooperating with said upturned end portion and a nut engaging one of said catch members to draw said clamping member to clamping position.

3. A clamping member comprising a band having an upturned end portion and a hole adjacent to said end portion, said band having its other end reduced to form a tongue, said tongue being adapted to lie within said hole whereby said band will form an enclosure, catch members struck up from said band adjacent to said reduced end, a nut having a finger adapted to engage said catch members, and a bolt cooperating with said upturned end portion and said nut for applying a compressive action to said band.

4. A clamping member comprising a band having an upturned end portion and a hole adjacent to said end portion said band having its other end reduced to form a tongue, said tongue being adapted to lie within said hole whereby said band will form an enclosure, catch members struck up from said band adjacent to said reduced end, a nut, said nut having fingers located on opposite side edges thereof, and a screw-threaded hole extending through said nut placed closer to one of said fingers than to the other of said fingers, and a screw-threaded bolt cooperating with said upturned end portion and said nut to apply a compressive movement to said band.

5. A clamping band having an aperture near one end thereof and having its opposite end reduced to form a tongue adapted to project through said aperture, said band being provided with catch means on said tongue, means for pulling said ends toward one another comprising a bolt and nut for applying compressive action to said band, said nut being provided with means for engaging said catch means.

6. A clamping member comprising a band having an aperture near one end thereof and having its other end reduced to form a tongue, said band being provided with catch means adjacent to the reduced end thereof, means for pulling said ends toward one another comprising a bolt and nut for applying compressive action to said band, said nut being provided with means to engage said catch means to grip same.

7. A clamping band having an aperture near one end thereof and having its opposite end reduced to form a tongue adapted to project through said aperture, a bolt engaging one end portion of said band, and a nut engaging the other end portion of said band at a point off center of said nut, whereby said nut is adapted to have a rocking and locking action relative to said bolt when said band is drawn to clamping position.

8. A clamping band having an aperture near one end thereof and having its opposite end reduced to form a tongue adapted to project through said aperture, a bolt engaging one end portion thereof, a nut having means offset from the center thereof for engaging the other end portion of said band, said bolt and nut having a locking action when said band is drawn to clamping position.

9. A clamping band, a bolt engaging one end portion thereof, a threaded nut on said bolt, said nut having means offset from the center thereof for engaging the other end portion of said band, said other end portion of said band being provided with a plurality of spaced catch members for engagement with said means.

10. A clamping band having an aperture near one end thereof having its opposite end reduced to form a tongue adapted to project through said aperture, a bolt engaging said one end and a nut having means offset from the center thereof for engaging said opposite end, said bolt and nut having a locking action when said band is drawn to clamping position.

Signed at Chicago, Illinois, this 5th day of May, 1922.

ALFRED L. EUSTICE.